Oct. 9, 1962 A. L. BLOOM 3,058,053
GYROMAGNETIC MAGNETOMETER METHOD AND APPARATUS
Filed Aug. 26, 1957
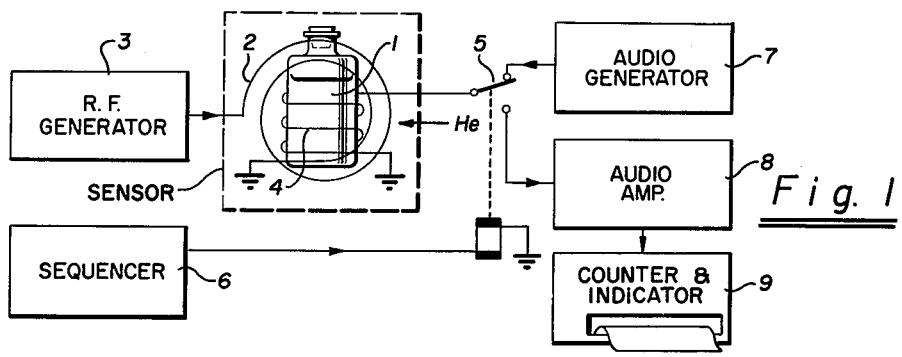
Fig. 1
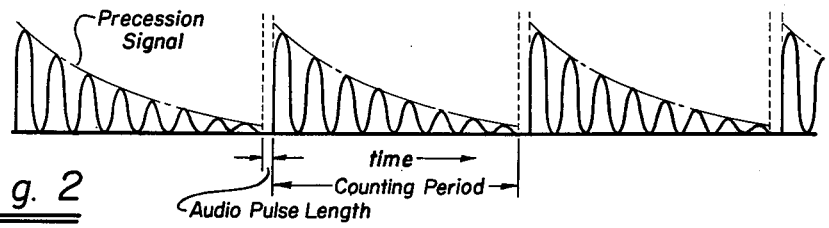
Fig. 2
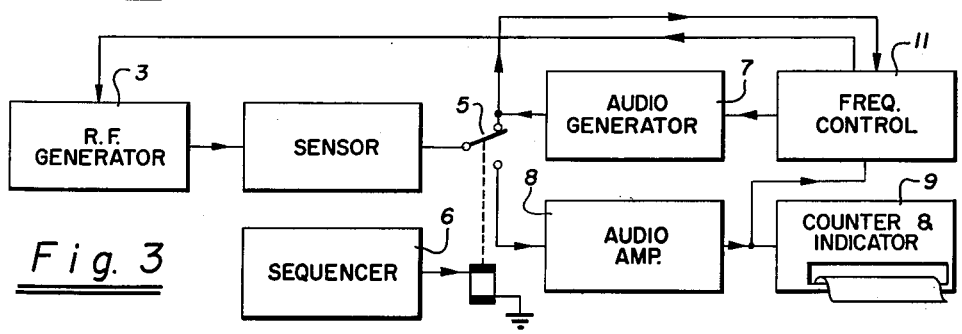
Fig. 3
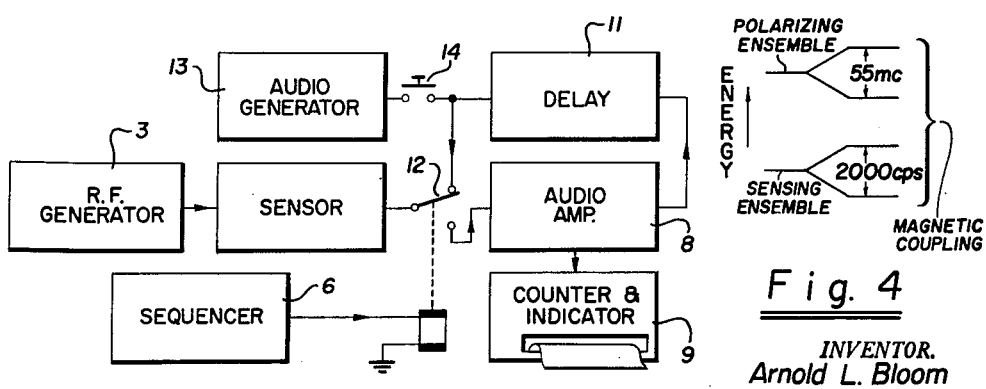
Fig. 4
Fig. 5
INVENTOR.
Arnold L. Bloom
BY William J. Nolan
Attorney

United States Patent Office 3,058,053
Patented Oct. 9, 1962

3,058,053
GYROMAGNETIC MAGNETOMETER METHOD AND APPARATUS
Arnold L. Bloom, Los Altos, Calif., assignor to Varian Associates, Palo Alto, Calif., a corporation of California
Filed Aug. 26, 1957, Ser. No. 680,283
12 Claims. (Cl. 324—.5)

The present invention relates in general to a magnetic field measuring method and apparatus and more particularly to a novel gyromagnetic free precession method and apparatus for sensing the strength of weak magnetic fields such as, for example, the earth's field. The present method and apparatus is especially useful for increasing the precision with which the earth's magnetic field may be measured from a moving platform. Such uses include airborne magnetic surveys, submarine detection and many other important applications.

The present invention is an improvement relating to the free precession method for detecting weak magnetic fields as taught in U.S. Patent Re. 23,769 issued to Russell H. Varian on January 12, 1954, entitled "Method and Means for Correlating Nuclear Properties of Atoms and Magnetic Fields." In the prior art free precession method an ensemble of gyromagnetic bodies such as, for example, the hydrogen nuclei of water was immersed in a magnetic field of unknown intensity such as, for example, the earth's magnetic field. The individual magnetic moments of the gyromagnetic bodies making up the ensemble were then tipped at an angle with respect to the unknown field by the application of a relatively strong polarizing D.C. magnetic field, at an angle to the unknown field. The relatively strong magnetic field was then suddenly removed and the individual gyromagnetic bodies forming the ensemble freely and coherently precessed about the unknown field at a frequency directly dependent on the field strength. A coil was disposed surrounding the ensemble of gyromagnetic bodies and the precessing bodies induced a signal in the coil, the frequency of which was a precise measure of the unknown magnetic field intensity. The frequency was then counted and indicated whereby a record was obtained of the magnetic field intensity.

Using this prior art method, indications of the magnetic field intensity may be obtained periodically. Time is required for polarizing and for counting the precession frequency. It turns out that a substantial portion of the operating cycle is devoted to polarizing the gyromagnetic bodies and therefore a substantial distance may be traversed by a moving platform between successive field readings.

The present invention provides a novel method and apparatus for the measurement of magnetic fields. The new method is characterized by the provision of a polarizing ensemble of gyromagnetic bodies such as, for example, the unpaired electrons in peroxylamine disulfonate ion dissolved in water. In such a solution the unpaired electrons are magnetically coupled to the hydrogen nuclei of the water. It has been found that by exciting gyromagnetic resonance of the polarizing ensemble or electrons an enhanced magnetic polarization of the hydrogen nuclei is obtained. This enhanced nuclear polarization allows the use of a short pulse of time varying magnetic field at the Larmor frequency of the hydrogen nuclei to be employed for polarizing the sensing ensemble or hydrogen nuclei at an angle to the unknown magnetic field in place of the strong D.C. magnetic field. Upon the termination of the short pulse of time varying magnetic field the sensing ensemble enters into free precessions which serve to measure the unknown field in accordance with the standard free precession method. Since the duration of the pulse of time varying magnetic field is much shorter than the heretofore utilized D.C. pulse the rapidity with which readings of the field may be obtained is greatly enhanced.

The principal object of the present invention is to provide a novel method and apparatus for measuring the intensity of magnetic fields wherein the rapidity with which readings of the magnetic field may be obtained is greatly increased.

One feature of the present invention is the provision of a polarizing ensemble, in the free precession method for measuring magnetic fields, said polarizing ensemble comprising a second group of gyromagnetic bodies magnetically coupled to the sensing ensemble and said polarizing ensemble put into a state of partial saturated resonance whereby the sensing ensemble is raised to a non-equilibrium energy state to decrease the time required to polarize the sensing ensemble at an angle to the unknown field it is desired to measure.

Another feature of the present invention is the application of a short pulse of time varying energy at the Larmor frequency to the sensing ensemble to polarize said sensing ensemble at an angle with respect to the unknown field, it is desired to measure, whereby the time required to polarize the sensing ensemble using the free precession method is greatly decreased.

Another feature of the present invention is the provision of means for holding the frequency of a source of time varying energy at the Larmor frequency of the sensing ensemble whereby the time required to polarize the sensing ensemble is substantially reduced.

Another feature of the present invention is the provision of delay means for delaying the free precession signal derived from the sensing ensemble such that the delayed signal may be applied to the sensing ensemble to produce polarization therein at an angle to the unknown field.

These and other features and advantages of the present invention will become more apparent after a perusal of the specification taken in connection with the accompanying drawings wherein, FIG. 1 is a schematic block diagram of the novel method and apparatus of the present invention, FIG. 2 is a diagram in the time domain indicating the sequencing operations of the apparatus of FIG. 1, FIG. 3 is a schematic block diagram of the novel method and apparatus of the present invention, FIG. 4 is a schematic atomic energy level diagram indicating the magnetic field splitting of the sensing and polarizing ensembles, and FIG. 5 is a schematic block diagram of a novel method and apparatus of the present invention.

Referring now to FIG. 1 there is shown in block diagram form the novel apparatus of the present invention. More specifically, a suitable sample of matter 1 containing both the sensing and polarizing ensembles of gyromagnetic bodies such as, for example, peroxylamine disulfonate ion dissolved in water is placed in a suitable nonmagnetic container. The sample 1 is then exposed to the magnetic field of unknown intensity as, for example, the earth's magnetic field $H_e$. A transmitter coil 2 is positioned surrounding the sample of matter and an R.F. generator 3 is coupled thereto to supply energy to the sample of matter 1 via the transmitter coil 2 at substantially the gyromagnetic resonance frequency of the polarizing ensemble of electrons.

A detector coil 4 envelops the sample of matter 1 and is connected to a two position relay 5. The relay 5 is actuated via a signal derived from a sequencer 6 to alternately connect the detector coil 4 to an audio generator 7 and then an audio amplifier 8. The audio generator 7 when connected to the detector coil 4 via relay 5 applies to the sensing gyromagnetic ensemble electromagnetic energy at substantially the Larmor frequency of the sensing ensemble in the unknown magnetic field $H_e$.

When the signal from the audio generator 7 has been applied to the sensing ensemble for a sufficient period of time (see FIG. 2) as determined by sequencer 6 and more fully described below, the sequencer actuates relay 5 and connects the audio amplifier 8 to the detector coil 4. The free precession signal then received in detector coil 4 is fed via relay 5 to the audio amplifier 8 wherein it is amplified and fed to a counter and indicator 9 for counting the frequency of the precession signal and indicating the intensity of the magnetic field.

Although the same coil 4 has been shown for applying the audio generator signal to the sensing ensemble and for receiving the precession signal, of course separate coils may be utilized for these separate functions. Moreover by a proper choice of parameters a single coil may be utilized for replacing the transmitter coil 2 and detector coil 4.

In operation the R.F. generator 3 applies time varying electromagnetic energy to the polarizing ensemble of gyromagnetic bodies at substantially the Larmor frequency thereof to produce partial saturated resonance thereof. For example, utilizing the unpaired electrons in the free radical of a $$\frac{1}{100}$$

molar water solution of peroxylamine disulfonate ion and $$\frac{1}{10}$$

molar of sodium carbonate for maintaining an alkaline pH of 10 to 12 as the polarizing ensemble the gyromagnetic resonance frequency is approximately 55 mc. (see FIG. 4). More precisely, the resonant frequency of such a polarizing ensemble is 55 mc. plus or minus 1.87 mc. per gauss of magnetic field intensity. The 55 mc. component comes from the atomic environment, that is, due to the position of the electron with respect to the remaining portion of the ion and therefore the 55 mc. component is independent of the magnetic field.

When measuring small magnetic field intensities, such as encountered in the earth's field, or when measuring other fields which do not vary appreciably, the R.F. generator frequency may be held substantially constant. However, if large fluctuations are encountered in the field it is desired to measure and the field is of substantial intensity, substantial fluctuations will be encountered in the resonance frequency of the polarizing ensemble and means must be provided, which are shown in FIG. 3, for correcting the frequency of the R.F. generator to the resonance frequency of the polarizing ensemble.

Partial saturated resonance of the polarizing ensemble of gyromagnetic bodies, in the above example, electrons, serves by way of a magnetic coupling to raise the sensing ensemble, in the above example, hydrogen nuclei, to the higher energy state. Due to this coupling at any instant of time there are a preponderance of the bodies in the sensing ensemble in the higher energy state. However, continuous coherent precession of the sensing ensemble is not obtained since the individual bodies of the sensing ensemble are dropping or precessing to the lower energy state in a noncoherent or out-of-phase fashion.

Accordingly, means are provided which include the audio generator 7 to produce a coherence in the precession of the nuclei from the higher to the lower energy state. This coherence is obtained by applying a pulse of time varying energy derived from the audio generator 7 to the sensing ensemble at the Larmor resonance frequency thereof obtained initially as by sweeping the frequency of audio generator 7 to the Larmor frequency to tip the sensing ensemble at an angle of approximately 90° with respect to the unknown field it is desired to measure.

When the pulse is sharply terminated the bodies of the sensing ensemble are in phase and will precess coherently to the lower energy state.

The proper duration, $t$, of the pulse of time varying audio frequency signal can be determined from the following expression:

$$t = \frac{\pi}{2\gamma H_1}$$

where $\gamma$ is the gyromagnetic ratio of the sensing ensemble and $H_1$ is one half the peak intensity of the time varying magnetic field. It can be seen from the foregoing expression that the time is inversely proportional to the magnetic field intensity $H_1$ such that a strong or high intensity pulse of audio frequency requires less time to tip the sensing gyromagnetic ensemble to the 90° position.

After the sensing ensemble has been tipped to the 90° position the sequencer 6 actuates relay 5 to connect the audio amplifier 8 to the detector coil 4. The precessing gyromagnetic bodies of the sensing ensemble then induce a free precessional signal having a decaying exponential envelope into the detector coil 4. The free precessional signal is fed via relay 5 to the input of the audio amplifier 8 wherein the signal is amplified. The output of audio amplifier 8 is fed to a counter and indicator 9 as of, for example, a binary counter and recorder wherein the frequency of the precession signal is measured and recorded. In this manner the intensity of the magnetic field $H_e$ is indicated.

When the precessional signal has decayed to the point where it is no longer of sufficient amplitude to provide a reliable count the sequencer again actuates relay 5 and connects audio generator 7 to the detector coil 4 for tipping the sensing ensemble to the 90° position and in this manner initiating another cycle of operaiton.

When utilizing a water solution of peroxylamine disulfonate care must be exercised to assure that the temperature of the sample does not exceed approximately 100° F. for appreciable periods of time as the ions will be deleteriously affected resulting in a destruction of the polarizing ensemble. Conventional cooling techniques such as, for example, heat sinks, water cooling radiating fins may be utilized, as desired, to cool the sample.

Referring now to FIG. 3 there is shown another embodiment of the present invention. In this embodiment the apparatus and method is substantially identical to that of FIG. 1 with the exception that signals are derived from the output of the audio generator 7 and from the output of the audio amplifier 8 and both signals are fed to the input of a frequency controller 11 as of, for example, a phase sensitive detector which compares the frequencies of the two signals to derive a control signal for applying to the audio frequency generator 7 to hold the frequency thereof at the Larmor frequency of the sensing ensemble. In addition, a portion of the output of frequency control 11 is fed to R.F. generator 3 for keeping the frequency thereof on the resonant frequency of the polarizing ensemble. In this manner the frequencies of the audio generator 7 and the R.F. generator are maintained at the resonaant frequency of the respective ensembles in a fluctuating magnetic environment.

Referring now to FIG. 5 there is shown another embodiment of the present invention. In this embodiment the apparatus and method is substantially identical to that of FIG. 1 with the exception that the audio generator 7 is replaced by a suitable delay 11 such as, for example, a magnetic drum recorder or a system of high Q vibrating reeds. The delay 11 derives its input from the audio amplifier 8. The delay serves to delay a portion of the precessional signal obtained from the output of audio amplifier 8 for a suitable length of time such as, for example one tenth of a second. In this manner there will be present at one terminal 12 of relay 5 a pulse of energy at the Larmor frequency of the sensing ensemble of sufficient duration to tip the sensing ensemble to the 90° position. A variable frequency audio generator 13 is coupled into terminal 12 via a push-to-actuate switch 14 for initiating the operating cycle of the system by supplying a pulse of energy at the Larmor frequency to the sensing ensemble as required to tip the sensing ensemble 90° to the direction of the unknown field. After the cycle of operation has been initiated said variable frequency audio generator 13 may be disconnected from the circuit without affecting the proper operation of the apparatus.

Other combinations of polarizing and sensing ensembles can also be used in this invention. One such combination is a solution of manganous salt in water. Here the protons in water are the sensing ensemble and the manganous ions are the polarizing ensemble. The frequency of the R.F. needed to saturate the hyperfine resonance of the manganous ion is about 200 megacycles. Another combination is a solution of alkali metal (lithium, sodium or potassium) in liquid ammonia. Here the protons in the ammonia are the sensing ensemble and the polarizing ensemble consists of free electrons in solution. The frequency of the polarizing ensemble resonance is 2.8 megacycles per gauss of applied magnetic field.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method for measuring magnetic field intensities comprising the steps of, immersing a sensing ensemble of gyromagnetic bodies in a magnetic field to be measured, immersing a polarizing ensemble of unpaired electrons in the magnetic field, said polarizing ensemble being magnetically coupled to said sensing ensemble, exciting resonance of the polarizing ensemble for raising the sensing ensemble to a nonequilibrium energy state, tipping the magnetic moments of the sensing ensemble at an angle to the magnetic field, freely precessing the sensing ensemble in the magnetic field, and measuring the precession frequency of the sensing ensemble to obtain a measure of the magnetic field intensity.

2. The method according to claim 1 wherein the step of tipping the magnetic moments of the sensing ensemble at an angle to the magnetic field comprises the step of applying a relatively short pulse of time varying magnetic field at the Larmor frequency of the sensing ensemble.

3. The method according to claim 2 wherein the duration of the pulse of time varying magnetic field is approximately given by the following expression:

$$t = \frac{\pi}{2\gamma H_1}$$

where $\gamma$ is the gyromagnetic ratio of the sensing ensemble, $H_1$ is one half the peak intensity of the time varying magnetic field, and $t$ is the duration of the pulse in seconds.

4. The method according to claim 2 wherein the step of measuring the free precession of the sensing ensemble comprises the steps of inducing an electromagnetic signal in a coil, said signal being in variable accordance with the free precession of the sensing ensemble, counting the frequency of said induced electromagnetic signal to obtain a measure of the magnetic field intensity.

5. The apparatus for measuring magnetic field intensities comprising, a sensing ensemble of gyromagnetic bodies adapted to be immersed in a magnetic field to be measured, a polarizing ensemble of unpaired electrons magnetically coupled to said sensing ensemble, means for exciting gyromagnetic resonance of the polarizing ensemble for raising the sensing ensemble to a nonequilibrium energy state, means for tipping the magnetic moments of the sensing ensemble at an angle to the magnetic field, and means for measuring the free precession frequency of the sensing ensemble to obtain a measure of the magnetic field intensity.

6. The apparatus according to claim 5 wherein said means for tipping the magnetic moments of the sensing ensemble at an angle to the magnetic field comprises a signal generator means adapted to apply to the sensing ensemble a time varying magnetic field component at the Larmor frequency of the sensing ensemble, and said time varying magnetic field having a component thereof at right angles to the magnetic field to be measured.

7. The apparatus according to claim 5 wherein said means for tipping the magnetic moments of the sensing ensemble at an angle to the magnetic field comprise means for deriving from the precessing sensing ensemble a signal at the free precession frequency, means for delaying a portion of the free precession signal, and means for applying said delayed free precession signal to said sensing ensemble for tipping the magnetic moments of the sensing ensemble at an angle to the magnetic field.

8. The apparatus according to claim 6 including means for comparing the free precession signal of said sensing ensemble with the output signal derived from said signal generator to obtain a control signal for varying the frequency of said signal generator means into coincidence with the free precession signal frequency of said sensing ensemble.

9. The apparatus according to claim 5 wherein said polarizing ensemble of gyromagnetic bodies comprises the unpaired electrons in a water solution of peroxylamine disulfonate ion.

10. The apparatus according to claim 9 wherein said sensing ensemble of gyromagnetic bodies comprises the hydrogen nuclei of water.

11. The method according to claim 2 wherein the magnetic field is the earth's magnetic field whereby a measure of the earth's magnetic field intensity is obtained.

12. The apparatus according to claim 6 wherein the magnetic field is the earth's magnetic field whereby an extremely accurate measurement of the earth's magnetic field intensity is obtained.

References Cited in the file of this patent

UNITED STATES PATENTS

Re. 23,769    Varian _____ Jan. 12, 1954

OTHER REFERENCES

Hahn: Physics Today, vol. 6, No. 11, November 1953, pp. 4–9.

Abragam: Physical Review, vol. 98, No. 6, June 15, 1955, pp. 1729–1735.

Feher: Physical Review, vol. 103, No. 2, July 16, 1956, pp. 500, 501.

Abragam et al.: Academie des Sciences, Comptes Rendus, vol. 245, No. 2, July 8, 1957, pp. 157 to 160 incl.

Hopkins: The Review of Scientific Instruments, vol. 20, No. 6, June 1949, pp. 401 and 402.

Herzog et al.: Physical Review, vol. 103, No. 1, July 1956, pp. 148 to 166.

Burgess et al.: Physical Review, vol. 100, No. 2, October 1955, pp. 752 and 753.